United States Patent Office

Re. 24,702

Reissued Sept. 22, 1959

24,702

POLYMERIC SANITARY COATING SYSTEM

Daniel M. Gray and George L. Reymann, Sewickley, Pa., assignors, by mesne assignments, to American-Marietta Company, Stoner-Mudge Co. Division, Chicago, Ill., a corporation of Illinois No Drawing. Original No. 2,780,564, dated February 5, 1957, Serial No. 421,685, April 7, 1954. Application for reissue January 20, 1958, Serial No. 710,169

31 Claims. (Cl. 117—75)

Matter enclosed in heavy brackets [ ] appears in the original patent but forms no part of this reissue specification; matter printed in italics indicates the additions made by reissue.

This invention relates to preparing coatings for metal surfaces, particularly interior and exterior metal surfaces of containers for foods, beverages and other products, including closures for such containers. This application is a continuation-in-part of our co-pending application Serial No. 237,493, filed July 18, 1951 (Patent No. 2,675,334), which is a continuation-in-part of our application Serial No. 152,761, filed March 29, 1950 and later abandoned.

Research has been directed for many years to the problem of improving sanitary coatings for food and beverage containers, taking into consideration the many special requirements which must be observed in regard to such coatings. Many special coatings have been developed which have proved satisfactory in some respects, but their use has been limited by deficiencies in other respects. Vinyl halide polymers, for example, have fair thermal stability but poor adherence and solubility characteristics. Copolymers of vinyl chloride and vinyl acetate have better solubility characteristics in the more active solvents, such as ketones and esters, and comparable adherence but poorer thermal stability. The latter difficulties may be overcome to some extent in the case of vinyl halide polymers and copolymers of vinyl chloride and vinyl acetate, by adding to the copolymer an oleoresinous varnish modifier previously heat treated to such extent that the mixture is compatible in solution but stratifies when baked on a bare or primed metal surface, with the varnish base migrating to said surface to improve the bond (cf. Maier Patent No. 2,380,456). However, vinyl halide polymers, and copolymers of vinyl chloride and vinyl acetate, whether or not so oil-modified, are substantially insoluble in aromatic hydrocarbon solvents, which are relatively inexpensive and therefore desirable solvents to use for practical purposes. In accordance with our present invention there is provided a compatible solution of copolymers of vinyl chloride and vinylidene chloride with an oleoresinous modifier in solvents which can consist entirely of one or a mixture of benzene and higher boiling aromatic hydrocarbon solvents, the solution being stable during prolonged storage but capable of stratification when baked on a primed or unprimed metal substrate, with the modifier migrating towards the substrate to improve the bond with the substrate through molecular orientation while at the same time permitting the vinyl chloride and vinylidene chloride copolymer to migrate toward the exposed surface of the coating. The resultant composite semi-layered coating has a sufficient concentration of vinyl chloride/vinylidene chloride copolymer adjacent the exposed surface to impart superior qualities of chemical resistance and strength to the coating as a whole, and a sufficient concentration of the modifier adjacent the substrate to impart superior qualities of adherence and thermal stability to the coating as a whole. The coating of our invention has excellent adherence over a wide range of baking temperatures from as low as 260° F. up to relatively high limits of baking temperatures before thermal decomposition begins, the lower temperatures serving, for example, to protect adjacent lithography, and the higher temperatures permitting quicker bakes. Unmodified vinyl chloride/vinylidene chloride copolymer coatings, in contrast, are less adherent even at their optimum baking temperature, are poorly adherent at baking temperatures below 300° F., and have lower maximum baking temperatures. We have found that for the purposes of our present invention the vinyl chloride/vinylidene chloride copolymer must have its weight ratio of vinyl chloride to vinylidene chloride in the copolymer limited to the range between 30/70 to 75/25, inclusive, in order to retain full solubility of the coating composition in liquid aromatic hydrocarbon solvents (higher ratios of vinylidene chloride tend to reduce solubility in ketones as well as in aromatic hydrocarbon solvents). However, even within said range of proportions it is necessary to control the polymerization conditions, or to purify the copolymer by filtration or otherwise, to ensure that the copolymer in question is substantially free of homopolymers of vinyl chloride and vinylidene chloride respectively, or copolymers thereof outside of the above-stated range of proportions. Moreover, an acceptable copolymer for our purposes must have a specific viscosity within the range of about 0.12 to 0.30, inclusive, as determined at 25° C., using a 0.4% solution of the copolymer in nitrobenzene. A specific viscosity below the stated range results in a relatively brittle coating with poor thermal stability, and above the stated range results in excessively high solution viscosity for our purposes.

An example of a copolymer of vinyl chloride and vinylidene chloride usable in accordance with the invention, hereinafter referred to as copolymer A, is made as follows: 82 parts of vinyl chloride and 18 parts of vinylidene chloride are placed together in a glass container at 20° C. and exposed, with agitation, to ultraviolet light, such as may be provided with a 100 watt G.E.–7 mercury vapor lamp. After 36 to 72 hours of such treatment the resulting mixture of copolymer and unreacted monomers is removed from the container and dried to remove the unreacted monomers. A copolymer of approximately 60% vinyl chloride and 40% vinylidene chloride is obtained, because the vinylidene chloride enters the copolymer at a faster rate than the vinyl chloride. Copolymers with other ratios of vinyl chloride and vinylidene chloride content may be prepared in a like manner by varying the proportions of the starting charges of vinyl chloride and vinylidene chloride. Other methods of producing a usable copolymer may be employed, such as the above method without ultraviolet light but with a catalyst, such as benzoyl peroxide, and, if necessary, with subsequent filtration to remove the homopolymers which are not soluble in aromatic hydrocarbon solvents. An example of a suitable commercially available copolymer of vinyl chloride and vinylidene chloride is "Geon 200x20" of B. F. Goodrich Chemical Company, which has a vinyl chloride/vinylidene chloride ratio of substantially 60/40, and is useful for the purposes of the invention, subject to the above-indicated requirements of complete solubility in aromatic hydrocarbon solvents, and range of viscosity. The examples of Geon 200x20 hereinafter referred to are those satisfying the said requirements.

An example of an oleoresinous modifier usable in accordance with the invention, hereinafter referred to as Modifier A, is made as follows: 20 parts of oil-soluble paraphenyl phenol/formaldehyde resin of non-heat hardening type (e.g., "Bakelite BR–254") and 20 parts of tung oil, are mixed in an open varnish kettle and heated to 350° F. in about 15 minutes, and are thereafter held at said temperature for an additional period of about 3 hours, to obtain a viscosity of 10–12 seconds at 350° F. (Zahn #3 cup). The exact cooking time is regulated to obtain a base which is compatible in solution with the copolymer with which it is to be used, but which is capable of stratifying to a metal surface when a solution of the copolymer and varnish base are filmed and baked on such surface. To permit handling the modifier after cooking, it is thinned with 60 parts of xylene, prior to adding it to the vinyl copolymer dissolved in additional solvent.

Other examples of modifiers usable in accordance with the invention, hereinafter known as Modifiers B and C, are made as follows: In the case of Modifier B, 20.7 parts of an unsaturated petroleum hydrocarbon resin (e.g., "Panarez 3–210" of Pan American Refining Corp., which has a Gardner color of 9, a softening point of 200–220° F., an iodine number of 230 and an acid number of less than 1) and 29.1 parts of a linseed oil modified with pentaerythritol and maleic anhydride (e.g., "Zymol" of Archer-Daniel-Midlands Company) are heated to about 425° F. in 30 minutes and held at that temperature for 60 minutes. The mixture is then cooled to 350° F. in 45 minutes, and 50.1 parts of xylene are added. In the case of Modifier C, 3.6 parts of a para-tertiary-amyl phenol/formaldehyde resin (e.g., "Bakelite BR–4036") and 28.6 parts of tung oil are heated to 350° F. in 30 minutes and held at that temperature for three hours. The mixture is then immediately mixed with 40.1 parts of a 50% solution of an unsaturated petroleum hydrocarbon resin (e.g., the above-mentioned "Panarez 3–210") in xylene. The solution is then diluted with 27.7 parts of xylene.

The useful range of ratios of the copolymer to the modifier solids for the purposes of the invention is 95/5 to 10/90, with compositions in the range of ratios from 90/10 to 25/75, inclusive, having the optimum baked film properties. The following Table I shows test re-

TABLE I

| Solids ratio of copolymer to Modifier A | 100/0 (50/50) | 95/5 (25/75) | 90/10 (10/90) | 80/20 (5/95) | 70/30 (2/98) | 60/40 (0/100) |
|---|---|---|---|---|---|---|
| (1) Solution properties: | | | | | | |
| (i) Color | Very light straw. (Very deep straw). | Straw (Very deep straw). | Straw (Very deep straw). | Deep Straw (Very deep straw). | Deeper straw. (Very deep straw). | Very deep straw. (Very deep straw). |
| (ii) Viscosity in seconds (at 80° F., No. 4 Ford cup) | 41 (17) | 39 (17) | 32 (17) | 26 (16) | 20 (16) | 17. (16). |
| (iii) Solution clarity | Clear (Slight haze). | Clear (Very slight haze). | Clear (Clear) | Clear (Clear) | Very slight haze. (Clear) | Very slight haze. (Clear). |
| (2) Coating properties: | | | | | | |
| (iv) Dry adhesion (10 perfect): | | | | | | |
| On tinplate | 3 (10) | 10 (10) | 10 (10) | 10 (10) | 10 (10) | 10. (10). |
| On blackplate | 8 (10) | 10 (10) | 10 (10) | 10 (10) | 10 (10) | 10. (10). |
| On primed tinplate | 9 (10) | 10 (10) | 10 (10) | 10 (10) | 10 (10) | 10. (10). |
| (v) Absence of blush on pasteurization in water at 170° F. (10 perfect): | | | | | | |
| On tinplate | 7 (10) | 9 (10) | 10 (10) | 10 (10) | 10 (10) | 10. (10). |
| On blackplate | 6 (10) | 8 (10) | 9 (10) | 10 (10) | 10 (10) | 10. (10). |
| On primed tinplate | 8 (10) | 9 (10) | 10 (10) | 10 (10) | 10 (10) | 10. (10). |
| (vi) Adhesion while wet after said pasteurization (10 perfect): | | | | | | |
| On tinplate | 0 (10) | 9 (10) | 10 (10) | 10 (10) | 10 (10) | 10. (10). |
| On blackplate | 5 (10) | 9 (10) | 10 (10) | 10 (10) | 10 (10) | 10. (10). |
| On primed tinplate | 9 (10) | 9 (10) | 10 (10) | 10 (10) | 10 (10) | 10. (10). |
| (vii) Flexibility when bent double: | | | | | | |
| On tinplate | Excellent (Excellent) | Excellent (Excellent) | Excellent (Excellent) | Excellent (Good) | Excellent (Fair) | Excellent. (Fair). |
| On blackplate | Excellent (Excellent) | Excellent (Excellent) | Excellent (Good) | Excellent (Fair) | Excellent (Fair) | Excellent. (Fair). |
| On primed tinplate | Excellent (Excellent) | Excellent (Excellent) | Excellent (Excellent) | Excellent (Good) | Excellent (Fair) | Excellent. (Fair). |
| (viii) Fabrication into 28 mm. screw cap: | | | | | | |
| On tinplate | Fair-Good (Excellent) | Excellent (Excellent) | Excellent (Good) | Excellent (Fair) | Excellent (Fair) | Excellent. (Fair). |
| On blackplate | Fair-Good (Excellent) | Excellent (Excellent) | Excellent (Good) | Excellent (Fair) | Excellent (Fair) | Excellent. (Fair). |
| On primed tinplate | Good (Excellent) | Excellent (Excellent) | Excellent (Good) | Excellent (Fair) | Excellent (Fair) | Excellent. (Fair). |
| (ix) Clarity of baked film: | | | | | | |
| On tinplate | Clear (Slight haze). | Clear (Very slight haze). | Clear (Clear) | Very slight haze. (Clear) | Slight haze (Clear) | Slight haze. (Clear). |
| On blackplate | Clear (Slight haze). | Clear (Very slight haze). | Clear (Clear) | Very slight haze. (Clear) | Slight haze (Clear) | Slight haze. (Clear). |
| On primed tinplate | Clear (Slight haze). | Clear (Very slight haze). | Clear (Clear) | Very slight haze. (Clear) | Slight haze (Clear) | Slight haze. (Clear). |
| (x) Thermal stability (max. temp. at 10 min. bake before visible decomposition): | | | | | | |
| On tinplate | 300° F. (340° F.) | 310° F. (360° F.) | 320° F. (370° F.) | 330° F. (390° F.) | 335° F. (400° F.) | 340° F. (Over 400° F.). |
| On blackplate | 290° F. (340° F.) | 300° F. (360° F.) | 320° F. (370° F.) | 325° F. (390° F.) | 330° F. (400° F.) | 335° F. (Over 400° F.). |
| On primed tinplate | 320° F. (370° F.) | 330° F. (380° F.) | 340° F. (380° F.) | 350° F. (390° F.) | 360° F. (400° F.) | 370° F. (Over 400° F.). |

sults when using varying proportions of Modifier A and a 60/40 vinyl chloride/vinylidene chloride copolymer (sample of "Geon 200x20") in solutions consisting of 25% by weight of the combined copolymer and modifier solids, and 75% of xylene. The coating properties of such solutions were tested by roller coating such solutions on test specimens and baking the filmed coating at 325° F. for 7 minutes (except as noted in the more severe conditions for testing thermal stability, as indicated in item (x) of the table), the dry coating weights being 4–5 mg./sq. in. The test specimens were, first, unprimed ¼ lb. electrolytic tinplate; second, unprimed steel (blackplate); and third, ¼ lb. electrolytic tinplate primed with an oleoresinous primer. The solids ratios from 50/50 to 0/100 at the top of Table I, and their corresponding characteristics shown below, are parenthesized in order to distinguish them from the 100/0 to 60/40 solids ratios and their characteristics, which are not parenthesized.

The following Table II illustrates the effect of varying the vinyl chloride/vinylidene chloride ratio in the composition of the invention. The copolymers referred to in the table were made and tested as described above in regard to copolymer A except that the charge was varied to give the final ratios of vinyl chloride/vinylidene chloride indicated at the heat of the table. Modifier A was mixed with the copolymer in each instance in an 80/20 ratio of the copolymer to Modifier A on a dry weight solids basis, and the combined copolymer and modifier in each instance were dissolved at 25% solids concentration in solvent consisting solely of xylene, except that in the case of compositions in which the copolymer had vinyl chloride/vinylidene chloride ratios of 20/80 and 80/20, respectively, the copolymer would not dissolve sufficiently for coating purposes. In the case of compositions having copolymer vinyl chloride/vinylidene chloride ratios of 30/70 to 75/25, inclusive, the constituents did dissolve satisfactorily, and the indicated examples of the latter compositions were each dip coated on unprimed ¼ lb. electrolytic tinplate and baked for 10 minutes at 330° F., except as noted in item (ix) of Table II.

TABLE III

| | A | B | C |
|---|---|---|---|
| (1) Composition: | | | |
| Modifier | 90/10 | 90/10 | 90/10 |
| Ratio of "Geon 200 x 20" to modifier | 20 | 20 | 20 |
| Percent solids (modifier and resin) in solution applied to test pieces | 10 | 9 | 8 |
| (2) Compatibility of modifier and resin in solution as evidenced by clarity of solution (10 perfect, 7 fair) | | | |
| (3) Applied coating tests (films roller coated and baked 10 min. at 300° F.; dry film weight 4–5 mg./sq. in.): | | | |
| (i) Compatibility of modifier and resin in final coating as evidenced by clarity (10 perfect, 7 fair) | 10 | 8 | 8 |
| (ii) Dry adhesion on unprimed 0.25 lb. electrolytic tinplate (10 perfect) | 10 | 9 | 10 |
| (iii) Dry adhesion on unprimed 0.85 lb. steel blackplate (10 perfect) | 10 | 10 | 10 |

The solvents usable in accordance with our invention preferably consist entirely of benzene and higher boiling aromatic hydrocarbon solvents, such as pure and commercial grades of benzene, toluene, xylene, ethyl benzene, and isopropyl benzene, and hi-flash naphtha and "Solvesso No. 100" (singly if deisred, but preferably mixed), because these solvents are not only suitable for the purpose, but also are relatively inexpensive. Full solubility in solely aromatic hydrocarbon solvents is obtained with solids concentrations of copolymer and modifier, when within the various specified limits, as high as 50% solids on a dry weight basis in such solvent. By varying the said solids concentration from a 15% minimum, viscosities are readily obtainable for coating by dip, brush, roll, spray and other conventional application means. More active solvents are not necessary and are ordinarily not desirable because of their higher cost. However, ketone and ester solvents may be used singly or mixed where desired, in total amounts up to 15% by weight of the total solvent, without adverse effect on the properties of the solution and final coating. For example, methyl ethyl ketone, methyl isobutyl ketone, cyclohexanone, isophorone, ethyl acetate and butyl propionate may be used up to said 15% limit, singly or mixed, to increase the proportion of solids in the solution at a given viscosity. Small amounts of up to 2% alcohols may also

TABLE II

| Ratio of vinyl chloride/vinylidene chloride | 20/80 | 30/70 | 50/50 | 75/25 | 80/20 |
|---|---|---|---|---|---|
| (1) Solution properties: | | | | | |
| (i) Solubility of copolymer in xylene | Insol. | Soluble | Soluble | Soluble | Insol. |
| (ii) Compatibility in solution of copolymer and modifier | | Good | Good | Good | |
| (2) Coating properties: | | | | | |
| (iii) Dry adhesion (10 perfect) | | 10 | 10 | 10 | |
| (iv) Absence of blush on pasteurization in water at 170° F. (10 perfect) | | 10 | 10 | 10 | |
| (v) Adhesion while wet after said pasteurization (10 perfect) | | 10 | 10 | 10 | |
| (vi) Flexibility when bent double | | Excellent | Excellent | Excellent | |
| (vii) Clarity of baked film | | Clear | Clear | Clear | |
| (viii) Color of baked film | | Pale gold | Pale gold | Pale gold | |
| (ix) Thermal stability (max. temp. at 10 min. bake before visible decomposition). | | 360° F | 330° F | 330° F | |

The modifier of the invention can employ one or a mixture of drying oils, such as tung oil, dehydrated castor oil, and linseed oil modified with maleic anhydride and pentaerythritol (e.g. "Zymol") as the drying oils, and one or a mixture of bodying resins of the oil soluble, non-heat hardening type, such as the following: para-phenyl phenol/formaldehyde ("Bakelite BR–254"), phenolic aldehyde resins ("Super-Beckacite 2000," "Bakelite 4036," "Varcum 250"), unsaturated petroleum hydrocarbon resins ("Velsicol AD450," "Panarez #3–210"), and treated and untreated natural resins (such as Soft Nevillac, and coumarone-indene resin). The range of useful ratios of the drying oil to bodying resin in the modifier is 20/80 to 67/33, inclusive. For example, the use of previously described modifiers A, B and C with "Geon 200x20" in solely xylene solvent is illustrated in the following Table III:

be used where desired for such purposes as assisting in filtration of the solution.

Pigments, dyes, waxes and other non-reactants may be added to the composition of the invention for decorative purposes and the like, without otherwise materially affecting the significant characteristics of the composition.

Typical illustrative examples of the composition and coating of the invention are as follows, showing various formulations applied in various ways to coat typical useful articles (the stated parts of modifier A, B and C solutions include both the solids and xylene constituents specified hereinabove in the description of the preparation of these modifiers):

Example I.—95 parts of a copolymer of vinyl chloride and vinylidene chloride in proportions of 30/70 are dissolved with agitation in 400 parts of benzene, and then 10 parts of the previously described modifier B solution and 3 parts of oil soluble red dye are successively added. When the resulting mixture, which has a total copolymer and modifier solids concentration of 20% and a viscosity of 28 seconds at 80° F. in a #4 Ford viscosity cup, is applied to unprimed aluminum foil by engraved roller at a wet thickness to yield a dry film weight of 2 milligrams per square inch, and is baked for 2 minutes at 340° F., it yields a tough, adherent, resistant, red-colored film. The coated foil is suitable for subsequent fabrication into foil wrapper for cheese.

Example II.—80 parts of a copolymer of vinyl chloride and vinylidene chloride in proportions of 60/40 are dissolved with agitation in 270 parts of xylene, and then 50 parts of the said modifier A solution and 25 parts of aluminum pigment are successively added. When the resulting mixture, which has a total copolymer and modifier solids concentration of 25% and a viscosity of 38 seconds at 80° F. in a #4 Ford viscosity cup, is applied to unprimed steel blackplate by roll coater at a wet thickness to yield a dry film weight of 5 milligrams per square inch, and is baked thereon for 15 minutes at 325° F., it yields a tough, adherent, resistant, aluminum-colored film. The coated article is suitable for subsequent fabrication into oil can ends.

Example III.—90 parts of a copolymer of vinyl chloride and vinylidene chloride in proportion of 60/40 are dissolved with agitation in 439 parts of toluene, and then 25 parts of modifier A solution are added. When the resulting mixture, which has a total copolymer and modifier solids concentration of 18% and a viscosity of 17 seconds at 80° F. in a #4 Ford viscosity cup, is sprayed onto oleoresinous primed tinplate can bodies at a wet thickness to yield a dry film weight of 7 milligrams per square inch, and is baked thereon for 10 minutes at 320° F., it yields a tough, adherent, resistant, clear film.

Example IV.—70 parts of a copolymer of vinyl chloride and vinylidene chloride in proportions of 75/25 are dissolved with agitation in a solvent mixture composed of 140 parts of xylene and 83 parts of hi-flash naphtha, and then 57 parts of the previously described modifier C solution and 85 parts of titanium dioxide pigment are successively added. When the resulting mixture, which has a total copolymer and modifier solids concentration of 30% and a viscosity of 130 seconds at 80° F. in a #4 Ford viscosity cup, is applied to unprimed tinplate by roll coater at a wet thickness to yield a dry film weight of 8 milligrams per square inch, and is baked thereon for 15 minutes at 340° F., it yields a tough, adherent, resistant, cream-colored film. The coated tinplate is suitable for subsequent fabrication into closures for glass containers.

Example V.—90 parts of a copolymer of vinyl chloride and vinylidene chloride in proportions of 63/37 are dissolved with agitation in a solvent mixture composed of 191 parts of xylene and 28 parts of "Solvesso 100," and then 25 parts of modifier A solution and 0.5 part of "Resinol Brown Y" are successively added. When the resulting mixture, which has a total copolymer and modifier solids concentration of 30% and a viscosity of 90 seconds at 80° F. in a #4 Ford viscosity cup, is applied to oleoresinous primed tinplate by roll coater at a wet thickness to yield a dry film weight of 4 milligrams per square inch, and is baked thereon for 7 minutes at 325° F., it yields a tough, adherent, resistant, clear film. The coated tinplate is suitable for subsequent fabrication into can ends.

Example VI.—40 parts of a copolymer of vinyl chloride and vinylidene chloride in proportions of 67/33 are dissolved with agitation in 240 parts of xylene, and then 120 parts of modifier B solution and 100 parts of titanium dioxide pigment are successively added. When the resulting mixture, which has a total copolymer and modifier solids concentration of 25% and a viscosity of 100 seconds at 80° F. in a #4 Ford viscosity cup, is applied to unprimed tinplate by roll coater at a wet thickness to yield a dry film weight of 5 milligrams per square inch, and is baked thereon for 7 minutes at 340° F., it yields a tough, adherent, resistant, buff-colored film. The coated tinplate is suitable for fabrication into metal canisters.

Example VII.—80 parts of a copolymer of vinyl chloride and vinylidene chloride in proportions of 50/50 are dissolved with agitation in 370 parts of toluene, and then 50 parts of modifier A solution and 10 parts of carbon black pigment are successively added. When the resulting mixture, which has a total copolymer and modifice solids concentration of 20% and viscosity of 70 seconds at 80° F. in a #4 Ford viscosity cup, is applied to an oleoresinous primed steel container by dipping at a wet thickness to yield a dry film weight of 8 milligrams per square inch, and is baked thereon for 10 minutes at 330° F., it yields a tough, adherent, resistant, black film on the container.

Example VIII.—25 parts of a copolymer of vinyl chloride and vinylidene chloride in proportions of 60/40 are dissolved with agitation in 188 parts of xylene, and then 187 parts of modifier A solution are added. When the resulting mixture, which has a total copolymer and modifier solids concentration of 25% and a viscosity of 16 seconds at 80° F. in a #4 Ford viscosity cup, is applied to unprimed tinplate by roll coater at a wet thickness to yield a dry film weight of 6 milligrams per square inch, and is baked thereon for 10 minutes at 355° F., it yields a tough, adherent, resistant, transparent gold-colored film. The coated tinplate is suitable for fabrication into can bodies.

While we have described present preferred embodiments of the invention and methods of practicing the same, it will be recognized that the invention is not limited thereto but may be otherwise variously embodied and practiced within the scope of the following claims.

We claim:

1. A coating composition in which the resin, oil and solvent constituents consist essentially of (I) copolymer selected from copolymer of vinyl chloride and vinylidene chloride in proportions of 30/70 to 75/25, inclusive, and mixtures thereof, and characterized by complete solubility in xylene at 25% solids concentration and by specific viscosity of substantialy 0.12 to 0.30 determined at 25° C. in 0.4% solution in nitrobenzene; (II) solvent of which at least 85% consists of liquid aromatic hydrocarbon material having a boiling point at least as high as benzene, the balance of the solvent consisting of material selected from the group consisting of methyl ethyl ketone, methyl isobutyl ketone, cyclohexanone, isophorone, ethyl acetate, butyl propionate, and mixtures thereof; and (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90 inclusive.

2. A coating composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) organic solvent consisting substantially entirely of liquid aromatic hydrocarbon material having a boiling point at least as high as benzene; and (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90, inclusive.

3. A coating composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) solvent consisting of material selected from the group consisting of benzene, toluene, xylene and mixtures thereof; (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent in the range of 15 to 50%, inclusive, by weight, and the ratio of the coplyomer to the oleoresinous varnish base on a solids basis being in the range of 95/5 to 10/90, inclusive.

4. A coating composition in which the resin, oil and solvent constituents consist essentially of (I) copolymer of vinyl chloride and vinylidene chloride in proportions of substantially 60/40 and characterized by complete solubility in xylene at 25% solids concentration and by specific viscosity of substantially 0.12 to 0.30 determined at 25° C. in 0.4% solution in nitrobenzene; (II) organic solvent consisting substantially entirely of liquid aromatic hydrocarbon material having a boiling point at least as high as benzene; and (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90, inclusive.

5. A coating composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) organic solvent consisting substantially entirely of liquid aromatic hydrocarbon material having a boiling point at least as high as benzene; and (III) an oleoresinous varnish base which consists of drying oil heated with oil-soluble, non-heat hardening varnish resin, which has a drying oil/varnish resin ratio in the range of 20/80 to 67/33, inclusive, which is compatible in solution in said solvent with the said coplyomer constituent but is capable of stratifying toward a metal surface when the composition is filmed on said surface, and in which said drying oil is selected from the group consisting of tung oil, dehydrated castor oil and linseed oil, and said varnish resin is selected from the group consisting of phenolic/aldehyde resins, petroleum resins and natural resins; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90, inclusive.

6. A coating composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) organic solvent consisting substantially entirely of liquid aromatic hydrocarbon material having a boiling point at least as high as benzene; and (III) an oleoresinous varnish base which consists of tung oil heated with oil-soluble, non-heat hardening para-phenyl phenol/formaldehyde resin in substantially equal proportions, which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90, inclusive.

7. A coating composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) organic solvent consisting substantially entirely of liquid aromatic hydrocarbon material having a boiling point at least as high as benzene; and (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being in the range of 90/10 to 25/75, inclusive.

8. A coating composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) organic solvent consisting substantailly entirely of liquid aromatic hydrocarbon material having a boiling point at least as high as benzene; and (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight, and the ratio of the coplymer to the oleoresinous varnish base on a solids basis being substantially 90/10.

9. A coating composition in which the resin, oil and solvent constituents consist essentially of (I) copolymer of vinyl chloride and vinylidene chloride in proportions of substantially 60/40, characterized by complete solubility in xylene at 25% solids concentration and by specific viscosity of substantially 0.12 to 0.30 determined at 25° C. in 0.4% solution in nitrobenzene; (II) solvent selected from the group consisting of benzene, toluene, xylene and mixtures thereof; and (III) an oleoresinous varnish base which consists of tung oil heated with oil soluble, non-heat hardening para-phenyl phenol/formaldehyde varnish resin, the oil and resin being in substantially equal proportions, and which is compatible in solution in said solvent with the said copolymer but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90, inclusive.

10. A coating composition in which the resin, oil and solvent constituents consist essentially of (I) copolymer of vinyl chloride and vinylidene chloride in proportions of substantially 60/40, characterized by complete solubility in xylene at 25% solids concentration and by specific viscosity of substantially 0.12 to 0.30 determined at 25° C. in 0.4% solution in nitrobenzene; (II) solvent selected from the group consisting of benzene, toluene, xylene and mixtures thereof; and (III) an oleoresinous varnish base which consists of tung oil heated with oil soluble, non-heat hardening para-phenyl phenol/formaldehyde varnish resin, the oil and resin being in substantially equal proportions, and which is compatible in solution in said solvent with the said copolymer but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being substantially 90/10.

11. A process of coating a metal surface comprising the steps of filming on the metal surface a composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) solvent of which at least 85% consists of liquid aromatic hydrocarbon material having a boiling point at least as high as benzene, the balance of the solvent consisting of material selected from the group consisting of methyl ethyl ketone, methyl isobutyl ketone, cyclohexanone, isophorone, ethyl acetate, butyl propionate, and mixtures thereof; and (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90, inclusive; and baking the filmed composition on the metal surface at a temperature of at least 260° F. to form a strong, resistant, adherent coating thereon.

12. A process of coating a metal surface comprising the steps of filming on the metal surface a composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) solvent of which at least 85% consists of liquid aromatic hydrocarbon material having a boiling point at least as high as benzene, the balance of the solvent consisting of methyl ethyl ketone, methyl isobutyl ketone, cyclohexanone, isophorone, ethyl acetate, butyl propionate, and mixtures thereof; and (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90, inclusive; and baking the filmed composition on the metal surface at a temperature in the range of below 300° F. down to 260° F. to form a strong, resistant, adherent coating thereon.

13. A process of coating a metal surface comprising the steps of filming on the metal surface a composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) solvent of which at least 85% consists of liquid aromatic hydrocarbon material having a boiling point at least as high as benzene, the balance of the solvent consisting of methyl ethyl ketone, methyl isobutyl ketone, cyclohexanone, isophorone, ethyl acetate, butyl propionate, and mixtures thereof; and (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50% inclusive, by weight, and the ratio of the copolymer to the oleoresinous varnish base on a solids basis being in the range of 90/10 to 25/75, inclusive; and baking the filmed composition on the metal surface at a temperature of at least 260° F. to form a strong, resistant, adherent coating thereon.

14. A process of coating a metal surface comprising the steps of filming on the metal surface a composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) solvent of which at least 85% consists of liquid aromatic hydrocarbon material having a boiling point at least as high as benzene, the balance of the solvent consisting of methyl ethyl ketone, methyl isobutyl ketone, cyclohexanone, isophorone, ethyl acetate;

butyl propionate, and mixtures thereof; and (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight and the ratio of the copolymer to the oleoresinous varnish base on a solids basis being substantially 90/10; and baking the filmed composition on the metal surface at a temperature of at least 260° F. to form a strong, resistant, adherent coating thereon.

15. A process of coating a metal surface comprising the steps of filming on the metal surface a composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) solvent of which at least 85% consists of liquid aromatic hydrocarbon material having a boiling point at least as high as benzene, the balance of the solvent consisting of methyl ethyl ketone, methyl isobutyl ketone, cyclohexanone, isophorone, ethyl acetate, butyl propionate, and mixtures thereof; and (III) an oleoresinous varnish base which consists of tung oil heated at substantially 350° F. for approximately 3 hours with oil-soluble, non-heat hardening para-phenyl phenol/formaldehyde resin, which has a drying oil/varnish resin ratio of substantially 50/50, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90, inclusive; and baking the filmed composition on the metal surface at a temperature of at least 260° F. to form a strong, resistant, adherent coating thereon.

16. A process of coating a metal surface comprising the steps of filming on the metal surface a composition in which the resin, oil and solvent constituents consist essentially of (I) copolymer of vinyl chloride and vinylidene chloride in proportions of substantially 60/40 and characterized by complete solubility in xylene at 25% solids concentration and by specific viscosity of substantially 0.12 to 0.30 determined at 25° C. in 0.4% solution in nitrobenzene; (II) solvent of which at least 85% consists of liquid aromatic hydrocarbon material having a boiling point at least as high as benzene, the balance of the solvent consisting of methyl ethyl ketone, methyl isobutyl ketone, cyclohexanone, isophorone, ethyl acetate, butyl propionate, and mixtures thereof; and (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90, inclusive; and baking the filmed composition on the metal surface at a temperature of at least 260° F. to form a strong, resistant, adherent coating thereon.

17. A process of coating a metal surface, comprising the steps of filming on the surface a composition in which the resin, oil and solvent constituents consist essentially of (I) copolymers of vinyl chloride and vinylidene chloride in a ratio of substantially 60/40 and characterized by complete solubility in xylene at 25% solids concentration and by specific viscosity of substantially 0.12 to 0.30 determined at 25° C. in a 0.4% solution in nitrobenzene; (II) solvent selected from the group consisting of benzene, toluene, xylene and mixtures thereof; and (III) an oleoresinous varnish base consisting of substantially equal proportions of tung oil and para-phenyl phenol/formaldehyde heated together at substantially 350° F. for approximately 3 hours; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90, inclusive; and baking the filmed composition on the surface at a temperature of at least 260° F. to form a strong, resistant, adherent coating thereon.

18. A process of coating a metal surface, comprising the steps of filming on the surface a composition in which the resin, oil and solvent constituents consist essentially of (I) copolymers of vinyl chloride and vinylidene chloride in a ratio of substantially 60/40 and characterized by complete solubility in xylene at 25% solids concentration and by specific viscosity of substantially 0.12 to 0.30 determined at 25° C. in a 0.4% solution in nitrobenzene; (II) solvent selected from the group consisting of benzene, toluene, xylene and mixtures thereof; and (III) an oleoresinous varnish base consisting of substantially equal proportions of tung oil and para-phenyl phenol/formaldehyde heated together at substantially 350° F. for approximately 3 hours; the combined solids concentration of the copolymer and oleoresinous varnish base in the solvent being in the range of 15 to 50%, inclusive, by weight, and the ratio of the copolymer to the oleoresinous varnish base on a solids basis being substantially 90/10; and baking the filmed composition on the surface at a temperature of at least 260° F. to form a strong, resistant, adherent coating thereon.

19. A process of coating a tinplate surface, comprising the steps of filming on the tinplate surface a composition in which the resin, oil and solvent constituents consist essentially of (I) copolymers of vinyl chloride and vinylidene chloride in a ratio of substantially 60/40 and characterized by complete solubility in xylene at 25% solids concentration and by specific viscosity of substantially 0.12 to 0.30 determined at 25° C. in a 0.4% solution in nitrobenzene; (II) solvent selected from the group consisting of benzene, toluene, xylene and mixtures thereof; and (III) an oleoresinous varnish base consisting of substantially equal proportions of tung oil and para-phenyl phenol/formaldehyde heated together at substantially 350° F. for approximately 3 hours; the combined solids concentration of the copolymer and oleoresinous varnish base in the solvent being in the range of 15 to 50%, inclusive, by weight, and the ratio of the copolymer to the oleoresinous varnish base on a solids basis being in the range of 90/10 to 25/75, inclusive; and baking the filmed composition on the tinplate surface at a temperature of at least 320° F. to form a strong, resistant, adherent coating thereon.

20. A process of coating a primed tin surface comprising the steps of filming on the said surface a composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) solvent of which at least 85% consists of liquid aromatic hydrocarbon material having a boiling point at least as high as benzene, the balance of the solvent consisting of methyl ethyl ketone, methyl isobutyl ketone, cyclohexanone, isophorone, ethyl acetate, butyl propionate, and mixtures thereof; and (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90, inclusive; and baking the filmed composition on the said surface at a temperature of at least 260° F. to form a strong, resistant, adherent coating thereon.

21. A process of coating a bare tin surface comprising the steps of filming on the said surface a composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) solvent of which at least 85% consists of liquid aromatic hydrocarbon material having a boiling point at least as high as benzene, the balance of the solvent consisting of methyl ethyl ketone, methyl isobutyl ketone, cyclohexanone, isophorone, ethyl acetate, butyl propionate, and mixtures thereof; and (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90, inclusive; and baking the filmed composition on the said surface at a temperature of at least 260° F. to form a strong, resistant, adherent coating thereon.

22. A process of coating a primed iron surface comprising the steps of filming on the said surface a composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) solvent of which at least 85% consists of liquid aromatic hydrocarbon material having a boiling point at least as high as benzene, the balance of the solvent consisting of methyl ethyl ketone, methyl isobutyl ketone, cyclohexanone, isophorone, ethyl acetate, butyl propionate, and mixtures thereof; and (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90, inclusive; and baking the filmed composition on the said surface at a temperature of at least 260° F. to form a strong, resistant, adherent coating thereon.

23. A process of coating a bare iron surface comprising the steps of filming on the said surface a composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) solvent of which at least 85% consists of liquid aromatic hydrocarbon material having a boiling point at least as high as benzene, the balance of the solvent consisting of methyl ethyl ketone, methyl isobutyl ketone, cyclohexanone, isophorone, ethyl acetate, butyl propionate, and mixtures thereof; and (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90, inclusive; and baking the filmed composition on the said surface at a temperature of at least 260° F. to form a strong, resistant, adherent coating thereon.

24. A process of coating a primed aluminum surface comprising the steps of filming on the said surface a composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) solvent of which at least 85% consists of liquid aromatic hydrocarbon material having a boiling point at least as high as benzene, the balance of the solvent consisting of methyl ethyl ketone, methyl isobutyl ketone, cyclohexanone, isophorone, ethyl acetate, butyl propionate, and mixtures thereof; and (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90, inclusive; and baking the filmed composition on the said surface at a temperature of at least 260° F. to form a strong, resistant, adherent coating thereon.

25. A process of coating a bare aluminum surface comprising the steps of filming on the said surface a composition in which the resin, oil and solvent constituents consist essentially of (I) copolymer selected from copolymers of vinyl chloride and vinylidene chloride in proportions of 30/70 to 75/25, inclusive, and mixtures thereof, and characterized by complete solubility in xylene at 25% solids concentration and by specific viscosity of substantially 0.12 to 0.30 determined at 25° C. in 0.4% solution in nitrobenzene; (II) solvent of which at least 85% consists of liquid aromatic hydrocarbon material having a boiling point at least as high as benzene, the balance of the solvent consisting of methyl ethyl ketone, methyl isobutyl ketone, cyclohexanone, isophorone, ethyl acetate, butyl propionate, and mixtures thereof; and (III) an oleoresinous varnish base which consists of drying oil heated with oil-soluble, non-heat hardening varnish resin, which has a drying oil/varnish resin ratio in the range of 20/80 to 67/33, inclusive, and which is compatible in solution in said solvent with the said copolymer constituent but is capable of stratifying toward a metal surface when the composition is filmed on said surface; the combined solids concentration of the copolymer and oleoresinous varnish base in the solvent being in the range of 15 to 50%, inclusive, by weight, and the ratio of the copolymer to the oleoresinous varnish base on a solids basis being in the range of 95/5 to 10/90, inclusive; and baking the filmed composition on the said surface at a temperature of at least 260° F. to form a strong, resistant, adherent coating thereon.

*26. A metal product having a heat-cured coating adhered to a surface thereof, said heat-cured coating consisting essentially of (1) copolymers selected from copolymers of vinyl chloride and vinylidene chloride in proportions of 30/70 to 75/25, inclusive, and mixtures thereof, said copolymers being substantially free of homopolymers of vinyl chloride and vinylidene chloride respectively and copolymers thereof outside of the above-stated range of proportions; (2) an oleoresinous varnish base which consists of drying oil heated with oil-soluble, non-heat hardening varnish resin, which has a drying oil/varnish resin ratio in the range of 20/80 to 67/33, inclusive, the weight ratio of said copolymers to said oleoresinous varnish base on a solids basis being in the range of 95/5 to 10/90 and said oleoresinous varnish base and said copolymers being stratified in said cured coating to form a semi-layered coating, the exposed surface of said coating being rich in said copolymer and the surface of said coating adjacent said metal surface being rich in said oleoresinous varnish base.*

*27. A metal product having a heat-cured coating adhered to a surface thereof as recited in claim 26, in which the ratio of the copolymer to the oleoresinous varnish base is in the range of 90/10 to 25/75.*

*28. A metal product having a heat-cured coating adhered to a surface thereof as recited in claim 26, in which said metal surface is tinplate.*

*29. A metal product having a heat-cured coating adhered to a surface thereof as recited in claim 28 in which said tinplate has a primer coat thereon.*

*30. A metal product having a heat-cured coating adhered to a surface thereof as recited in claim 26, in which said metal surface is steel.*

*31. A metal product having a heat-cured coating adhered to a surface thereof as recited in claim 26, in which said oleoresinous varnish base consists of tung oil heated at substantially 350° F. for approximately 3 hours with oil-soluble, non-heat hardening para-phenyl phenol/formaldehyde resin, which has a drying oil/varnish resin ratio of substantially 50/50.*

References Cited in the file of this patent or the original patent

UNITED STATES PATENTS

| | | |
|---|---|---|
| 2,380,456 | Maier et al. | July 31, 1945 |
| 2,384,885 | Britton et al. | Sept. 18, 1945 |
| 2,793,141 | Barr | May 21, 1957 |